G. R. HOLMES.
POWER MOWER.
APPLICATION FILED JAN. 15, 1916.
1,204,767.
Patented Nov. 14, 1916.
2 SHEETS—SHEET 1.
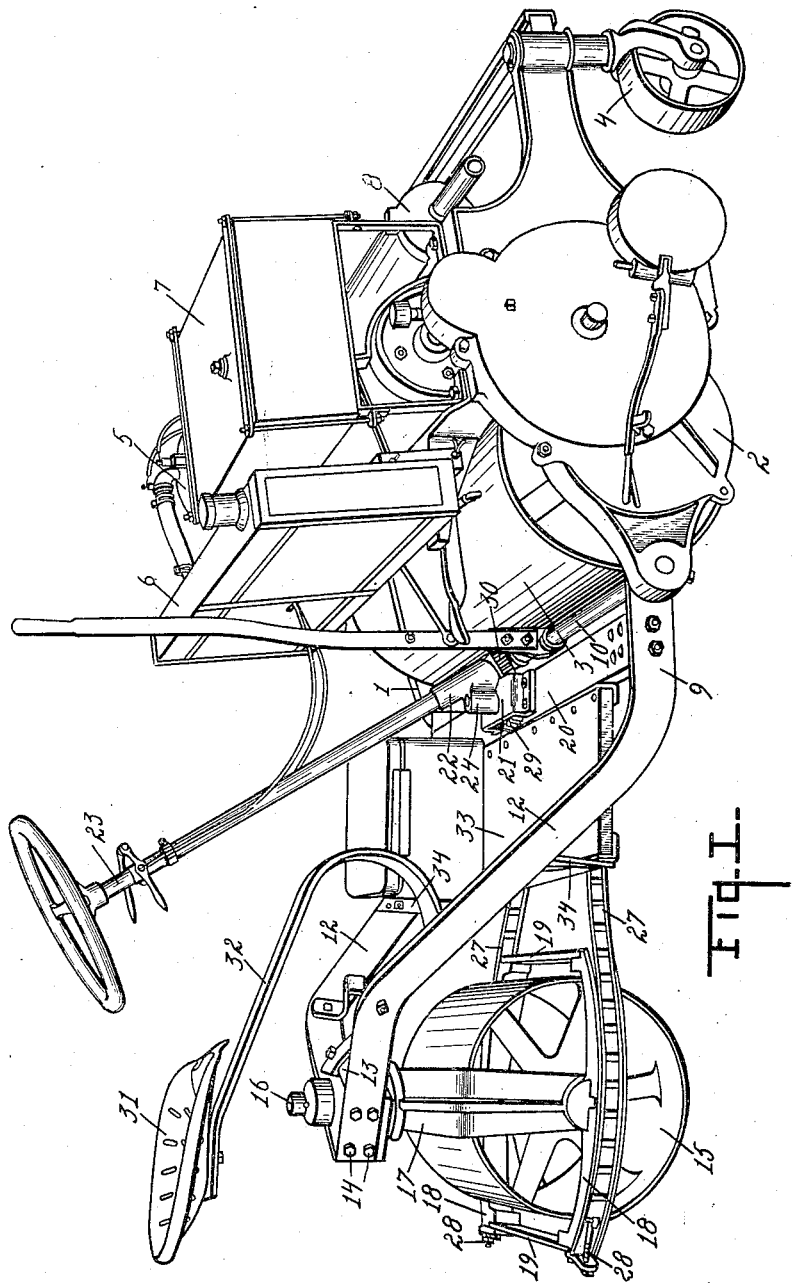
WITNESSES:
Luther Blake
Lenn Gilman
INVENTOR.
George R. Holmes
BY Chappell Earl
ATTORNEYS.

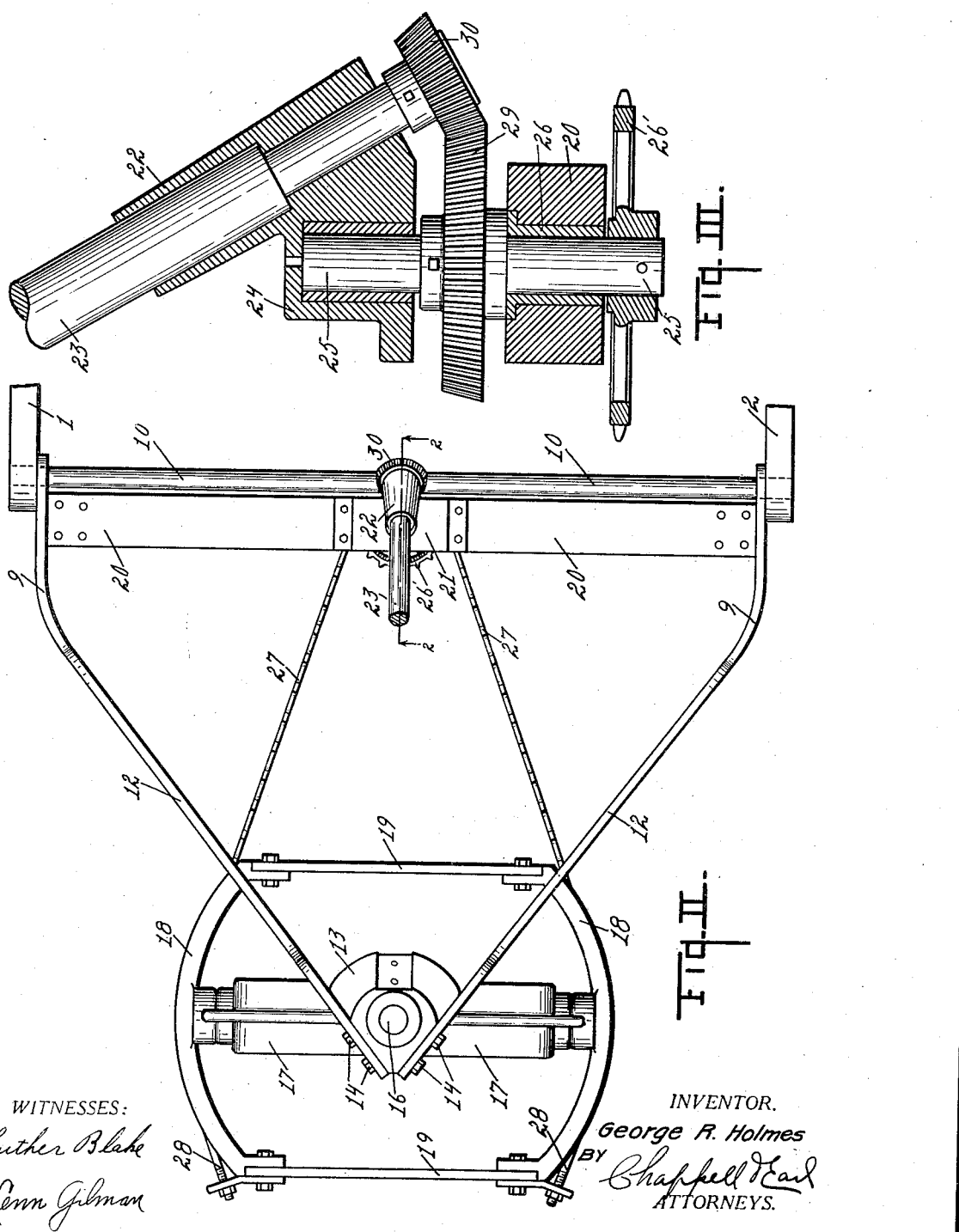

UNITED STATES PATENT OFFICE.

GEORGE R. HOLMES, OF LANSING, MICHIGAN, ASSIGNOR TO THE LANSING MOWER COMPANY, OF LANSING, MICHIGAN.

POWER-MOWER.

1,204,767.  Specification of Letters Patent.  Patented Nov. 14, 1916.

Application filed January 15, 1916. Serial No. 72,340.

*To all whom it may concern:*

Be it known that I, GEORGE R. HOLMES, a citizen of the United States, residing at Lansing, county of Ingham, State of Michigan, have invented certain new and useful Improvements in Power-Mowers, of which the following is a specification.

This invention relates to improvements in power mowers.

The main objects of this invention are: First, to provide an improved power mower which may be effectively used on quite rough or uneven ground. Second, to provide in a power mower an improved steering means. Third, to provide an improved power mower which may be effectively steered around trees and effectively turned without tearing or furrowing the sod.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a perspective view of a structure embodying the features of my invention. Fig. II is a plan view of the auxiliary frame. Fig. III is an enlarged detail, partially in section, on a line corresponding to line 3—3 of Fig. II, showing details of the steering connections.

In the drawing similar reference characters refer to similar parts throughout the several views, and the sectional views are taken looking in the direction of the little arrows at the ends of the section lines.

Referring to the drawing, the side members 1 and 2 of the main frame are of suitable form to provide bearings for the traction and lawn roller 3 and for the cutting mechanism and housings for the cutting mechanism gearing. The details of these parts are not shown as they form no part of my present invention. The traction roller 3 is mounted at the rear end of the main frame.

A pair of caster wheels 4 are arranged at the front end of the main frame. The cutting mechanism is disposed between the traction roller and these caster wheels. The driving motor, shown conventionally at 5, is mounted on the main frame as is also the water tank 6, fuel reservoir 7 and the muffler 8.

An auxiliary frame comprising side members 9 is pivotally mounted at the rear end of the main frame, the side members being journaled upon the rod 10 disposed at the rear of the traction roller 3. These side members converge rearwardly and are upwardly offset at 12. The rear ends of the side members 12 are connected by the spindle bearing casting 13 to which they are secured by the screws 14.

The steering wheel 15 is provided with a spindle 16 having a yoke 17 embracing the wheel. The steering wheel is surrounded by a frame comprising segmental side members 18 secured to the arms of the yoke and connected at the front and rear of the wheel by the cross bars 19. At their front ends the side bars 9 of the auxiliary frame are connected by a cross bar 20. At the center of this cross bar is a bracket 21 having a bearing 22 for the steering post 23 and a bearing 24 for the shaft 25. The cross bar 20 is provided with a bearing 26 for the lower end of the shaft 25. On the lower end of the shaft 25 is a sprocket wheel 26' over which the steering chain is passed. The ends of the chain 27 are secured at the rear ends of the steering wheel frame side pieces 18 by means of the bolts 28. The steering shaft 25 is connected to the steering post by the gears 29 and 30 respectively (see Fig. III).

The seat 31 is supported above the steering wheel by the spring 32 mounted on the steering wheel spindle bearing 13. A foot board 33 is supported by the cross piece 20 and suitable hangers 34 on the side members 9 of the auxiliary frame.

With the parts thus arranged, the operator occupying the seat 31 can effectively steer the machine, and by the arrangement of the traction roller at the rear of the main frame with the caster wheels at the front and pivotally connecting the auxiliary frame to the rear of the main frame with the steering wheel at the rear, the structure is flexible, so that the mower operates effectively over uneven surfaces, does not furrow or break the sod in turning, and is very convenient to manipulate in turning and also in avoiding trees and other obstructions.

Further, the strain upon the parts is minimized, which is a very decided advantage in structures of this kind.

I have illustrated my improvements in one of the forms in which I have embodied the same and found very satisfactory. I have not attempted to illustrate or describe certain modifications and adaptations of my improvements which might be desirable under certain conditions, as I believe the disclosure made will enable those skilled in the art to which my invention relates to embody or adapt the same as conditions may dictate.

Having thus described my invention, what I claim as new and desire to secure by Letters Patent, is:

1. In a lawn mower, the combination with a main frame, a traction roller mounted at the rear end of the said main frame, caster wheels mounted at the front end of said main frame, a driving motor carried by said main frame, an auxiliary frame comprising a pair of rearwardly converging side members, the rear ends of said side members being upwardly offset, a pivot rod for said side members mounted on said main frame at the rear of said traction roller, a cross bar extending between said side members at the front ends thereof, a steering post mounted on said cross bar, a spindle bearing mounted at the rear ends of said side members, a seat mounted above said spindle bearing, a steering wheel having a spindle journaled in said spindle bearing, and operating connections from said steering post to said steering wheel.

2. In a lawn mower, the combination with a main frame, a traction roller mounted at the rear end of said main frame, caster wheels mounted at the front end of said main frame, a driving motor carried by said main frame, an auxiliary frame comprising a pair of side members, a pivot rod for said side members mounted on said main frame at the rear of said traction roller, a steering post mounted on said auxiliary frame, a steering wheel at the rear end of said auxiliary frame, and operating connections from said steering post to said steering wheel.

3. In a lawn mower, the combination with a main frame, a traction roller mounted at the rear end of said main frame, caster wheels mounted at the front end of said main frame, a driving motor carried by said main frame, an auxiliary frame pivotally mounted on the rear end of said main frame, a steering post mounted on said auxiliary frame, a steering wheel, a steering wheel spindle provided with a yoke embracing said wheel, a steering wheel frame comprising side members disposed at the sides of the wheel and secured to the arms of said yoke, said side members being connected by cross bars at the front and rear of the wheel, a steering chain connected at its ends to the rear end of said steering frame side members, a spindle bearing mounted on the rear ends of said side members, a steering sprocket, connections from said post to said steering sprocket, and a seat mounted above said spindle bearing.

4. In a lawn mower, the combination with a main frame, a traction roller mounted at the rear end of said main frame, caster wheels mounted at the front end of said main frame, a driving motor mounted on said main frame, an auxiliary frame pivotally mounted on the rear end of said main frame, a steering wheel having a vertical spindle journaled at the rear end of said auxiliary frame, a seat mounted on said auxiliary frame above said steering wheel, a steering post mounted on said auxiliary frame at the front end thereof, and steering connections for said post to said steering wheel.

5. In a lawn mower, the combination with the main frame, a traction roller mounted at the rear end of said main frame, caster wheels mounted at the front end of said main frame, a driving motor mounted on said main frame, an auxiliary frame pivotally mounted on the rear end of said main frame, a steering wheel at the rear end of said auxiliary frame, a seat on said auxiliary frame, a steering post, and connections from said post to said steering wheel.

In witness whereof, I have hereunto set my hand in the presence of two witnesses.

GEORGE R. HOLMES.

Witnesses:
J. W. BAILEY,
CHAS. FERGUSON.